United States Patent
Sakurai et al.

(10) Patent No.: US 9,272,232 B2
(45) Date of Patent: Mar. 1, 2016

(54) POWDER ANTIFOAMING AGENT AND METHOD FOR PRODUCING SAME

(71) Applicant: SHIN-ETSU CHEMICAL CO., LTD., Tokyo (JP)

(72) Inventors: Takato Sakurai, Annaka (JP); Shinji Irifune, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 14/358,605

(22) PCT Filed: Oct. 18, 2012

(86) PCT No.: PCT/JP2012/076892
§ 371 (c)(1),
(2) Date: May 15, 2014

(87) PCT Pub. No.: WO2013/073329
PCT Pub. Date: May 23, 2013

(65) Prior Publication Data
US 2014/0336284 A1    Nov. 13, 2014

(30) Foreign Application Priority Data
Nov. 16, 2011 (JP) .................................. 2011-250321

(51) Int. Cl.
| | |
|---|---|
| B01D 19/02 | (2006.01) |
| B01D 19/04 | (2006.01) |
| C08J 3/12 | (2006.01) |
| C08K 13/02 | (2006.01) |
| C08K 9/10 | (2006.01) |
| C11D 3/00 | (2006.01) |

(52) U.S. Cl.
CPC ............ B01D 19/0409 (2013.01); C08J 3/122 (2013.01); C08J 3/126 (2013.01); C08K 13/02 (2013.01); C08K 9/10 (2013.01); C11D 3/0026 (2013.01)

(58) Field of Classification Search
None
See application file for complete search history.

(56) References Cited

U.S. PATENT DOCUMENTS

| | | | |
|---|---|---|---|
| 3,210,208 A | 10/1965 | Grass et al. | |
| 4,419,260 A | 12/1983 | Reuter et al. | |
| 4,542,171 A * | 9/1985 | Elser et al. | 523/201 |
| 5,024,937 A | 6/1991 | Penticoff et al. | |
| 5,073,384 A * | 12/1991 | Valentine et al. | 424/474 |
| 5,078,888 A * | 1/1992 | Penticoff et al. | 210/639 |
| 5,206,064 A * | 4/1993 | Scholz | A61L 15/12 428/321.5 |
| 5,589,449 A * | 12/1996 | Kolaitis et al. | 510/466 |
| 6,521,587 B1 * | 2/2003 | L'Hostis et al. | 510/466 |

FOREIGN PATENT DOCUMENTS

| | | | |
|---|---|---|---|
| GB | 892 787 | * | 3/1962 |
| GB | 892787 | | 3/1962 |
| JP | 60-106507 A | | 6/1985 |
| JP | 61-042309 A | | 2/1986 |
| JP | 02-293005 A | | 12/1990 |
| JP | 4224535 B2 | | 12/2008 |
| WO | WO 97/17939 | * | 5/1997 |
| WO | WO 97/17939 A1 | | 5/1997 |
| WO | WO 2007/004094 A1 | | 1/2007 |

OTHER PUBLICATIONS

"Glass Transition Temperature of Polydextrose as a Function of Moisture Content" authored by Kokini et al. and published in Carbohydrate Polymers (2003) 51, 273-280.*
International Search Report issued in PCT/JP2012/076892 dated Jan. 22, 2013.
European Patent Office Extended Search Report dated Apr. 8, 2015 for EP Application No. 12850709.2.
Langrish et al., "Comparison of Maltodextrin and Skim Milk Wall Deposition Rates in a Pilot-Scale Spray Dryer", ScienceDirect, 2007, pp. 84-89, vol. 179.
Madene et al., "Flavour Encapsulation and Controlled Release—A Review", International Journal of Food Science and Technology, 2006, pp. 1-21, vol. 41.

* cited by examiner

*Primary Examiner* — Marc Zimmer
(74) *Attorney, Agent, or Firm* — Birch, Stewart, Kolasch & Birch, LLP

(57) ABSTRACT

Disclosed is a powder antifoaming agent containing: (A) a hydrophobic organopolysiloxane that has a viscosity at 25° C. of 10-100,000 mm2/s; (B) a fine silica powder; (C) a surfactant; and (D) a water-soluble encapsulating agent that is in a solid state at 25° C. This powder antifoaming agent is characterized by being obtained by spray drying a dispersion liquid that is obtained by dispersing a silicone oil compound, which is obtained by mixing the component (A) and the component (B), and the component (D) in water in the presence of the component (C), and is also characterized in that the silicone oil compound is encapsulated by the component (D) that serves as an outer shell. Since the present powder antifoaming agent does not contain water by being produced by a spray drying method, the powder antifoaming agent is free from problems of emulsion antifoaming agents such as separation and putrefaction.

8 Claims, No Drawings

POWDER ANTIFOAMING AGENT AND METHOD FOR PRODUCING SAME

TECHNICAL FIELD

This invention relates to a powder silicone antifoaming agent and a method for preparing the same.

BACKGROUND ART

Silicone-based antifoaming agents have many superior properties to other antifoaming agents and are used in a wide variety of applications including foam-generating manufacturing steps involved in chemical, food, oil, textile, paper making, paper/pulp, and pharmaceutical industries and effluent and sewage treatments. Of the silicone-based antifoaming agents, antifoaming agents of emulsion type are commonly used which are obtained by mixing silicone oil such as dimethylpolysiloxane with finely divided silica and dispersing the oil compound in water together with a surfactant. Since the emulsion antifoaming agents are readily dispersible in foaming liquids, they exert antifoaming effect as soon as they are applied to foaming spots.

However, the emulsion antifoaming agents are so sensitive to temperature changes that problems may often arise during storage, such as compositional gradation, separation due to breaking of emulsion particles, and putrefaction. Therefore, they are unsuitable for long-term storage, with restrictions on their storage conditions.

To overcome these problems, Patent Document 1 (JP-A S60-106507) and Patent Document 2 (JP 4224535) propose powder antifoaming agents comprising antifoaming components adsorbed to oil-absorbing porous powder such as silica, aluminum oxide or talc.

However, the powder antifoaming agents having antifoaming components adsorbed to oil-absorbing porous powder such as silica, aluminum oxide or talc leave a noticeable amount of residual powder because of their composition. They are useful in effluent treatment and chemical and agrochemical industries, but not suitable in the food industry where the amount of food additives is restricted. Another drawback of the powder antifoaming agents comprising porous powder is that they are significantly inferior in water dispersibility and rapid action to the emulsion antifoaming agents.

SUMMARY OF INVENTION

Technical Problem

An object of the invention, which has been made in view of the problems in the prior art, is to provide a powder antifoaming agent which has equivalent water dispersibility and rapid action to the emulsion antifoaming agent, is suitable for long-term storage, and can be used as an internal additive to powder compositions and an additive to food, and a method for preparing the powder antifoaming agent.

Solution to Problem

Making extensive investigations to attain the above objects, the inventors have found that a silicone antifoaming agent of powder type can be prepared by dispersing a hydrophobic organopolysiloxane, finely divided silica, and a specific water-soluble encapsulant in water with the aid of a surfactant and spray drying the resulting water dispersion into powder particles by the spray dryer method, and that the powder antifoaming agent has equivalent water dispersibility and rapid action to the antifoaming agent of emulsion type, is suitable for long-term storage, and can be used as an internal additive to powder compositions and an additive to food. The invention is predicated on this finding.

The invention provides a powder antifoaming agent and a method for preparing the same, as defined below.

[1] A powder antifoaming agent comprising
  (A) a hydrophobic organopolysiloxane having a viscosity of 10 to 100,000 mm$^2$/s at 25° C.,
  (B) finely divided silica,
  (C) a surfactant, and
  (D) a water-soluble encapsulant which is solid at 25° C.,
wherein the powder antifoaming agent is prepared by mixing components (A) and (B) to form a silicone oil compound, dispersing the silicone oil compound and component (D) in water in the presence of component (C), and spray drying the water dispersion, the silicone oil compound being encapsulated in a shell of component (D).

[2] The powder antifoaming agent of [1] wherein component (D) has a glass transition temperature of 70° C. or higher.

[3] The powder antifoaming agent of [2] wherein component (D) is selected from the group consisting of a monosaccharide, polysaccharide, and sugar alcohol.

[4] The powder antifoaming agent of [3] wherein component (D) is maltodextrin.

[5] A method for preparing a powder antifoaming agent, comprising the steps of mixing (A) a hydrophobic organopolysiloxane having a viscosity of 10 to 100,000 mm$^2$/s at 25° C. with (B) finely divided silica to form a silicone oil compound, dispersing the silicone oil compound and (D) a water-soluble encapsulant which is solid at 25° C., in water with the aid of (C) a surfactant to form a water dispersion, and spray drying the water dispersion by the spray dryer method while a dryer outlet temperature in the spray drying step is set lower than the glass transition temperature of component (D).

[6] The method of [5] wherein a dryer inlet temperature in the spray drying step of the spray dryer method is 100 to 250° C.

[7] The method of [5] or [6] wherein the dryer outlet temperature in the spray drying step in the spray dryer method is at least 30° C. lower than the glass transition temperature of component (D).

[8] The method of any one of [5] to [7] wherein the glass transition temperature of component (D) is 70° C. or higher.

[9] The method of [8] wherein component (D) is selected from the group consisting of a monosaccharide, polysaccharide, and sugar alcohol.

[10] The method of [9] wherein component (D) is maltodextrin.

Advantageous Effects of Invention

Since the powder antifoaming agent of the invention is anhydrous due to its preparation by the spray dryer method, it eliminates the problems of separation and putrefaction as found in the emulsion antifoaming agent, and has excellent shelf stability. Since the spray dryer method ensures that the powder antifoaming agent is in powder particle form comprising a preformed silicone oil compound enclosed in a shell of a water-soluble encapsulant, the agent has equivalent water dispersibility and rapid action to the emulsion antifoaming agent and can be used as an internal additive to other powder compositions because of that form. It can be widely used not only in effluent and sewage treatments, chemical and textile industries, but also in food industry if all components used therein are acceptable as food additives.

In the practice of the inventive method, the powder antifoaming agent can be readily prepared by the spray dryer method using certain components.

DESCRIPTION OF EMBODIMENTS

[Powder Antifoaming Agent]

Now the invention is described in detail.

The powder antifoaming agent of the invention comprises (A) a hydrophobic organopolysiloxane having a viscosity of 10 to 100,000 mm$^2$/s at 25° C., (B) finely divided silica, (C) a surfactant, and (D) a water-soluble encapsulant which is solid at 25° C. The powder antifoaming agent is prepared by mixing components (A) and (B) to form a silicone oil compound (SOC), dispersing the silicone oil compound (SOC) and component (D) in water with the aid of a surfactant as component (C) to form a water dispersion, and spray drying the water dispersion by the spray dryer method while the glass transition temperature of component (D) is higher than a dryer outlet temperature in the spray drying step in the spray dryer method.

The essential components of the powder antifoaming agent are described one by one.

[(A) Hydrophobic Organopolysiloxane]

It is believed that the organopolysiloxane (A) cooperates with finely divided silica (B) to impart antifoaming properties to the composition. The hydrophobic organopolysiloxane may be either straight or branched and typically has the average compositional formula (I):

$$R^1_a SiO_{(4-a)/2} \tag{I}$$

wherein $R^1$ is each independently a substituted or unsubstituted monovalent hydrocarbon group and "a" is a number of 1.9 to 2.2.

In formula (I), $R^1$ which may be the same or different is a substituted or unsubstituted monovalent hydrocarbon group of 1 to 18 carbons. Examples of the monovalent hydrocarbon group represented by $R^1$ include alkyl groups such as methyl, ethyl, propyl, butyl, pentyl, hexyl, heptyl, octyl, nonyl, decyl, dodecyl, tridecyl, tetradecyl, hexadecyl, and octadecyl; cycloalkyl groups such as cyclohexyl; alkenyl groups such as vinyl and allyl; aryl groups such as phenyl and tolyl; aralkyl groups such as styryl and α-methylstyryl; or substituted forms of the foregoing in which some or all hydrogen atoms attached to carbon atoms are substituted by halogen atoms, cyano, amino, hydroxyl or the like, such as chloromethyl, 3-chloropropyl, 3,3,3-trifluoropropy, cyanoethyl, 3-aminopropyl, and N-(3-aminoethyl)-7-aminopropyl. It is preferred from the aspects of antifoaming properties and economy that at least 80 mol %, more preferably at least 90 mol % of all $R^1$ be methyl. The subscript "a" is a positive number of 1.9≤a≤2.2, preferably 1.95≤a≤2.15. The organopolysiloxane may be terminated with a triorganosilyl group: $R^1_3Si-$ or a diorganohydroxysilyl group: $HOR^1_2Si-$.

From the aspects of antifoaming properties and working, the essentially hydrophobic organopolysiloxane (A) should have a viscosity at 25° C. of 10 to 100,000 mm$^2$/s, preferably 50 to 10,000 mm$^2$/s, as measured by an Ostwald viscometer. If the viscosity is less than 10 mm$^2$/s, antifoaming properties are poor. If the viscosity exceeds 100,000 mm$^2$/s, the silicone oil compound becomes too viscous to work.

Preferred examples of the hydrophobic organopolysiloxane having formula (I) include dimethylpolysiloxane, diethylpolysiloxane, methylphenylpolysiloxane, dimethylsiloxane-diphenylsiloxane copolymers, methyl(3,3,3-trifluoropropyl)polysiloxane, and α,ω-dihydroxydimethylpolysiloxane.

[(B) Finely Divided Silica]

The finely divided silica used herein may be any of well-known ones, for example, wet silica such as precipitated silica, silica xerogel, and dry silica such as fumed silica. These silicas, which are hydrophilic, may be used as such, or surface treated with a compound having an organosilyl group into hydrophobic silica prior to use. Any commercially available products may be used as the finely divided silica, for example, Aerosil (Nippon Aerosil Co., Ltd.), Nipsil and Nipgel (Tosoh Silica Corp.), and Sylysia (Fuji Silysia Chemical Ltd.). The finely divided silica preferably has a specific surface area of at least 150 m$^2$/g, more preferably 150 to 500 m$^2$/g as measured by the BET method.

The finely divided silica as component (B) is preferably used in an amount of 1 to 20 parts by weight, more preferably 5 to 15 parts by weight per 100 parts by weight of component (A). Too small amounts of component (B) may lead to poor antifoaming properties whereas too much amounts of component (B) may increase the viscosity of the silicone oil compound (SOC) and adversely affect workability.

[(SOC) Silicone Oil Compound]

The silicone oil compound as component (SOC) may be prepared by mixing predetermined amounts of essentially hydrophobic organopolysiloxane (A) and finely divided silica (B), treating the mixture at a temperature from room temperature to 200° C., and optionally neutralizing and/or distilling off a low-boiling fraction. Further an inorganic ammonium salt, organosilicon compound, siloxane resin, alkali catalyst or the like may be added to the silicone oil compound for the purposes of improving retention of antifoaming properties, high-temperature properties, dilution stability, and alkali resistance, as described, for example, in JP-B H04-42043, JP-A H05-261206, and JP-A 2005-324140.

In the powder antifoaming agent composition of the invention, the content of silicone oil compound (SOC) is preferably 1 to 80% by weight, more preferably 15 to 50% by weight based on the total weight of the composition. Less than 1% by weight of the silicone oil compound may lead to poor antifoaming properties. More than 80% by weight of the silicone oil compound may cause difficult atomization by spray drying and adversely affect water dissolution and dispersion.

[(C) Surfactant]

The surfactant as component (C) serves to disperse the antifoaming component (silicone oil compound (SOC)) in water. It may be any of well-known surfactants, examples of which include sorbitan fatty acid esters, glycerol fatty acid esters, polyglycerol fatty acid esters, propylene glycol fatty acid esters, sucrose fatty acid esters, polyethylene glycol fatty acid esters, polyoxyethylene alkyl ethers, polyoxyethylene alkyl phenyl ethers, polyoxyethylene fatty acid esters, polyoxyethylene sorbitan fatty acid esters, polyoxyethylene glycerol fatty acid esters, polyoxyethylene propylene glycol fatty acid esters, polyoxyethylene castor oil, polyoxyethylene hydrogenated castor oil, and polyoxyalkylene-modified organopolysiloxanes.

In the powder antifoaming agent composition of the invention, the surfactant may be used alone or in admixture of two or more and in an amount of 1 to 60% by weight, preferably 5 to 40% by weight based on the total weight of the composition. A content of less than 1% by weight may lead to poor dispersion whereas a content in excess of 60% by weight may cause the antifoaming component to be completely dispersed in water, resulting in a decline of antifoaming effect.

[(D) Water-Soluble Encapsulant which is Solid at 25° C.]

Component (D) is not particularly limited as long as it can be used as a water-soluble encapsulant to form a shell for enclosing the antifoaming component therein, is solid at 25° C., and has a glass transition temperature which is higher than a dryer outlet temperature in the spray drying step in the spray dryer method to be described below, for example, a glass transition temperature of 70° C. or higher. The glass transition temperature is selected higher than the dryer outlet temperature in the spray drying step in the spray dryer method, for the purpose of preventing sprayed particles from melting in the dryer chamber to fail in particle formation. The glass transition temperature is preferably 70° C. or higher for the following reason. Now that the dryer outlet temperature is preferably at least 30° C. lower than the glass transition temperature of component (D) in order to obtain a proper powder in the dryer chamber without agglomeration (as will be described below), if the glass transition temperature is lower than 70° C., then the dryer outlet temperature is lower than 40° C., at which atomization is least viable.

Component (D), water-soluble encapsulant which is solid at 25° C. may be a water-soluble substance which is used for atomizing a hydrophobic organopolysiloxane or oil compound thereof in the powder antifoaming agent composition into particles in a stable manner. Examples include monosaccharides and polysaccharides such as glucose, fructose, lactose, maltose, sucrose, dextrin, maltodextrin, cyclodextrin, maltose, fructose, insulin, and trehalose;

sugar alcohols such as sorbitol, mannitol, maltitol, lactose, maltotriitol, and xylitol;

inorganic salts such as sodium chloride and sodium sulfate;

thickening polysaccharides such as gum arabic, guar gum, pectin, pullulan, and sodium alginate;

cellulose derivatives such as methyl cellulose and sodium carboxymethyl cellulose;

starch derivatives such as esterified, etherified or terminally reduced starch;

processed starches, decomposed gelatins, agar, polyvinyl alcohols, and amino acids.

Of these, monosaccharides, polysaccharides and sugar alcohols are preferred for solubility, and maltodextrin is most preferred from the aspect of particle formation. These substances may be used alone or in admixture.

The water-soluble encapsulant may be used in any desired amount as long as it is sufficient to enclose the antifoaming component (silicone oil compound) therein as a matrix. It is preferred from the aspect of efficient retention of the hydrophobic organopolysiloxane and oil compound thereof in good conditions that the water-soluble encapsulant be used in an amount of 20 to 95% by weight, more preferably 40 to 80% by weight based on the total weight of the powder antifoaming agent composition. If the water-soluble encapsulant is less than 20% by weight, the hydrophobic organopolysiloxane and oil compound thereof may not be sufficiently atomized. More than 95% by weight of the water-soluble encapsulant may result in a powder antifoaming agent composition having a lower content of antifoaming component and hence, poor antifoaming properties and is undesirable in economy.

The power antifoaming agent composition may further comprise other optional components as long as this does not compromise the objects of the invention. Examples include antifoaming co-agents, disintegrants, thickeners, preservatives, and bactericides.

Examples of the antifoaming co-agent include low HLB surfactants such as polypropylene glycol, glycerol fatty acid esters, polyoxyalkylene glycol fatty acid esters, and polyoxyalkylene glycol fatty acid esters, mineral oils, and polyoxyalkylene-modified organopolysiloxanes.

Examples of the disintegrant include hydroxypropyl celluloses having a low degree of substitution, crystalline celluloses, carmellose, croscarmellose sodium, sodium carboxymethyl starch, rice starch, corn starch, crospovidone, magnesium aluminometa silicate, magnesium aluminosilicate, and synthetic aluminum silicate.

Examples of the preservative and bactericide include sodium hypochlorite, sorbic acid, potassium sorbate, salicylic acid, sodium salicylate, benzoic acid, sodium benzoate, parabens, and isothiazoline compounds.

Examples of the thickener include polyacrylic acid, sodium polyacrylate, acrylic acid-methacrylic acid copolymers, sodium carboxymethyl cellulose, methyl cellulose, hydroxypropyl methyl cellulose, hydroxyethyl methyl cellulose, xanthan gum, and guar gum.

In the antifoaming agent composition, water must be added as component (E) in a necessary amount to emulsify and disperse components (A) to (D). The amount of water is a balance relative to the total of contents of components (A) to (D) and preferably 50 to 2,000 parts, more preferably 80 to 800 parts by weight per 100 parts by weight of components (A) to (D) combined.

[Method for Preparing Powder Antifoaming Agent]

The method for preparing a powder antifoaming agent according to the invention comprises the step of mixing a hydrophobic organopolysiloxane having a viscosity of 10 to 100,000 mm$^2$/s at 25° C. as component (A) and finely divided silica as component (B) to form a silicone oil compound (SOC) and dispersing the silicone oil compound (SOC) and a water-soluble encapsulant which is solid at 25° C. as component (D), in water with the aid of a surfactant as component (C) to form a water dispersion and the step of spray drying the water dispersion by the spray dryer method while a dryer outlet temperature in the spray drying step is set lower than the glass transition temperature of component (D), thereby atomizing the water dispersion into powder particles.

(1) Step of Forming Water Dispersion

The method for preparing a powder antifoaming agent according to the invention involves the first step of forming a water dispersion by mixing amounts of components (A) to (E) and uniformly milling and emulsifying them by a well-known technique, for example, on a mixing/dispersing machine such as a homomixer, homogenizer or colloid mill while optionally heating. Preferably, the antifoaming agent composition is prepared by uniformly mixing and dispersing amounts of components (A) to (D), adding a portion of component (E) thereto, milling and emulsifying the contents, then adding the remaining portion of component (E), and uniformly milling and mixing.

(2) Step of Atomizing Water Dispersion into Powder

The method involves the second step of atomizing the water dispersion from the first step into powder particles. Exemplary of the atomizing means is a well-known spray dryer equipment of spray drying the water dispersion by the spray dryer method. The spray dryer equipment is designed to spray the water dispersion through a nozzle into a dryer chamber and simultaneously introduce hot air at a predetermined temperature to remove water from the water dispersion for drying in the dryer chamber, thereby forming powder particles having the antifoaming component (silicone oil compound (SOC)) enclosed in a shell of the water-soluble encapsulant which is solid at 25° C. as component (D).

Among spray drying conditions used in the second step, the temperature of hot air introduced into the dryer chamber, that is, the temperature of a hot air inlet to the dryer chamber, which is referred to as "dryer inlet temperature," is preferably 100 to 250° C., more preferably 110 to 180° C. If the dryer inlet temperature is lower than 100° C., it may be difficult to evaporate a sufficient amount of water from the water dispersion. If the dryer inlet temperature is higher than 250° C., a dryer outlet temperature may rise as a result of such inlet temperature rise so that powder particles may agglomerate in the dryer chamber, failing to obtain a proper powder.

On the other hand, the temperature of hot air flowing out of the dryer chamber, that is, the temperature of a hot air outlet of the dryer chamber, which is referred to as "dryer outlet temperature," must be lower than the glass transition temperature of component (D). If the dryer outlet temperature is close to the glass transition temperature of component (D), an antifoaming agent in powder form can be formed, but powder particles are likely to agglomerate in the dryer chamber and antifoaming properties may worsen. Therefore, the dryer outlet temperature is preferably at least 30° C. lower than the glass transition temperature of component (D). The dryer outlet temperature is, for example, preferably 85° C. or lower, more preferably from 40° C. to 80° C.

The powder antifoaming agent of the invention thus obtained is anhydrous due to its preparation by the spray dryer method, eliminates the problem of separation or putrefaction associated with the emulsion type, and has excellent storage stability. Since the spray dryer method ensures that the antifoaming agent is in the powder form wherein a preformed silicone oil compound is enclosed in a shell of a water-soluble encapsulant, the agent has equivalent water dispersibility and rapid action to the emulsion antifoaming agent and can be used as an internal additive to other powder compositions because of that form. It can be widely used not only in effluent and sewage treatments, chemical and textile industries, but also in food industry if all components used therein are acceptable as food additives.

EXAMPLES

Examples of the invention are given below by way of illustration and not by way of limitation. In Examples, the viscosity is measured at 25° C. by a Cannon-Fenske viscometer (SO series No. 500, Sibata Scientific Technology Ltd.).
[Components]
Preparation of Silicone Oil Compound (SOC)
  Oil Compound (SOC-a)
  In a nitrogen gas atmosphere, 100 parts by weight of dimethylpolysiloxane having a viscosity of 1,000 mm²/s as hydrophobic organopolysiloxane and 10 parts by weight of hydrophilic wet silica having a BET specific surface area of 300 m²/g (Nipsil HD-2, Tosoh Silica Corp.) as finely divided silica were heated and mixed at 150° C. for 3 hours, yielding a silicone oil compound (SOC-a).
  Oil Compound (SOC-b)
  In a nitrogen gas atmosphere, 100 parts by weight of dimethylpolysiloxane having a viscosity of 1,000 mm²/s as hydrophobic organopolysiloxane and 10 parts of hydrophobic fumed silica having a BET specific surface area of 170 m²/g (Aerosil R974, Nippon Aerosil Co., Ltd.) as finely divided silica were heated and mixed at 160° C. for 3 hours, yielding a silicone oil compound (SOC-b).
(C) Surfactant
  (c-1) Sorbitan monostearate
  (c-2) Sorbitan monolaurate
  (c-3) Decaglycerol monooleate
  (c-4) Glycerol monostearate
  (c-5) Sucrose stearate (D) Water-Soluble Encapsulant which is Solid at 25° C.
  (d-1) Maltodextrin (glass transition temperature: 220° C.)
  (d-2) Lactose monohydrate (as lactose, melting point: 223° C., glass transition temperature: 101° C.)
  (d-3) Sucrose (melting point: 186° C., glass transition temperature: 62° C.)
(F) Thickener
  Sodium carboxymethyl cellulose (1 wt % aqueous solution, viscosity: 200 mPa·s)
(G) Polyoxyalkylene-Modified Organopolysiloxane
  Organopolysiloxane represented by the average compositional formula:

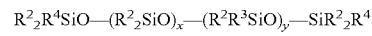

wherein $R^2$ and $R^4$ are $-CH_3$, $R^3$ is $-C_3H_6O(C_2H_4O)_{23}(C_3H_6O)_{23}C_4H_9$, x is 27, and y is 3, and having a viscosity of 1,700 mm²/s.
(H) Porous Powder Carrier (Silica)
  Nipsil AQ (Tosoh Silica Corp., specific surface area: 180 to 230 m²/g)

Example 1

Predetermined amounts of oil compound (SOC-a) (6.40 wt %) as silicone oil compound (SOC), sorbitan monostearate (c-1) (0.80 wt %), decaglycerol monooleate (c-3) (0.20 wt %), and glycerol monostearate (c-4) (0.40 wt %) as surfactant (C), maltodextrin (d-1) (12.00 wt %) as water-soluble encapsulant which is solid at 25° C. (D), sodium carboxymethyl cellulose (0.05 wt %) as thickener (F), and a portion of water as component (E) were weighed, heated at 80° C., and uniformly mixed on a homomixer. The remaining portion of water (E) (80.15 wt %) was gradually added to the mixture, forming an emulsion (water dispersion) of the composition shown in Table 1. Note that wt % in parentheses corresponds to the final composition of the emulsion.

Next this emulsion was spray dried by the spray dryer method under the spray conditions listed in Table 1 (i.e., dryer inlet temperature (measured) 169° C. and dryer outlet temperature (measured) 63° C.), obtaining a powder antifoaming agent.

Example 2

A powder antifoaming agent was prepared under the same conditions as in Example 1 except that the spray conditions in the spray dryer method were changed to a dryer inlet temperature (measured) of 151° C. and a dryer outlet temperature (measured) of 60° C.

Example 3

Predetermined amounts of oil compounds (SOC-a) (2.00 wt %) and (SOC-b) (4.00 wt %) as silicone oil compound (SOC), sorbitan monostearate (c-1) (0.80 wt %), sorbitan monolaurate (c-2) (0.40 wt %), glycerol monostearate (c-4) (0.20 wt %), and sucrose stearate (c-5) (0.10 wt %) as surfactant (C), maltodextrin (d-1) (12.00 wt %) as water-soluble encapsulant which is solid at 25° C. (D), and a portion of water as component (E) were weighed, heated at 80° C., and uniformly mixed on a homomixer. The remaining portion of water (E) (81.10 wt %) was gradually added to the mixture, forming an emulsion (water dispersion) of the composition shown in Table 1. Note that wt % in parentheses corresponds to the final composition of the emulsion.

Next this emulsion was spray dried by the spray dryer method under the spray conditions listed in Table 1 (i.e., dryer inlet temperature (measured) 148° C. and dryer outlet temperature (measured) 59° C.), obtaining a powder antifoaming agent.

Example 4

A powder antifoaming agent was prepared under the same conditions as in Example 1 except that one of the emulsion-forming components in Example 1 was changed, i.e., lactose monohydrate (d-2) (12.00 wt %) was used instead of maltodextrin (d-1) as water-soluble encapsulant which is solid at 25° C. (D), and the spray conditions in the spray dryer method were changed to a dryer inlet temperature (measured) of 149° C. and a dryer outlet temperature (measured) of 58° C.

Example 5

A powder antifoaming agent was prepared under the same conditions as in Example 4 except that the spray conditions in the spray dryer method were changed to a dryer inlet temperature (measured) of 170° C. and a dryer outlet temperature (measured) of 88° C.

Comparative Example 1

An attempt was made to prepare a powder antifoaming agent under the same conditions as in Example 1 except that some of the emulsion-forming components of Example 1 were changed, i.e., sucrose (d-3) (12.50 wt %) was used instead of maltodextrin (d-1) as water-soluble encapsulant which is solid at 25° C. (D), and the amount of water as component (E) was changed (79.65 wt %), and the spray conditions in the spray dryer method were changed to a dryer inlet temperature (measured) of 160° C. and a dryer outlet temperature (measured) of 76° C.

Comparative Example 2

Predetermined amounts of oil compound (SOC-a) (16.50 wt %) as silicone oil compound (SOC), sorbitan monostearate (c-1) (2.10 wt %), decaglycerol monooleate (c-3) (0.50 wt %), and glycerol monostearate (c-4) (1.05 wt %) as surfactant (C), nil water-soluble encapsulant which is solid at 25° C. (D), sodium carboxymethyl cellulose (0.15 wt %) as thickener (F), and a portion of water as component (E) were weighed, heated at 80° C., and uniformly mixed on a homomixer. The remaining portion of water (E) (79.70 wt %) was gradually added to the mixture, forming an emulsion (water dispersion) of the composition shown in Table 1. Note that wt % in parentheses corresponds to the final composition of the emulsion.

Next an attempt was made to prepare a powder antifoaming agent. This emulsion was spray dried by the spray dryer method under the spray conditions listed in Table 1 (i.e., dryer inlet temperature (measured) 150° C. and dryer outlet temperature (measured) 92° C.)

Comparative Example 3

Predetermined amounts of oil compound (SOC-a) (32.00 wt %) as silicone oil compound (SOC), sorbitan monostearate (c-1) (4.00 wt %), decaglycerol monooleate (c-3) (1.00 wt %), and glycerol monostearate (c-4) (2.00 wt %) as surfactant (C), nil water-soluble encapsulant which is solid at 25° C. (D), sodium carboxymethyl cellulose (0.05 wt %) as thickener (F), and a portion of water as component (E) were weighed, heated at 80° C., and uniformly mixed on a homomixer. The remaining portion of water (E) (60.95 wt %) was gradually added to the mixture, forming an emulsion antifoaming agent of the composition shown in Table 1. Note that wt % in parentheses corresponds to the final composition of the antifoaming agent.

Comparative Example 4

Predetermined amounts of oil compounds (SOC-a) (10.00 wt %) and (SOC-b) (20.00 wt %) as silicone oil compound (SOC), sorbitan monostearate (c-1) (2.00 wt %), sorbitan monolaurate (c-2) (1.00 wt %), glycerol monostearate (c-4) (1.00 wt %), and sucrose stearate (c-5) (0.50 wt %) as surfactant (C), nil water-soluble encapsulant which is solid at 25° C. (D), nil thickener (F), and a portion of water as component (E) were weighed, heated at 80° C., and uniformly mixed on a homomixer. The remaining portion of water (E) (65.50 wt %) was gradually added to the mixture, forming an emulsion antifoaming agent of the composition shown in Table 1. Note that wt % in parentheses corresponds to the final composition of the antifoaming agent.

Comparative Example 5

Predetermined amounts of oil compounds (SOC-a) (5.00 wt %) and (SOC-b) (15.00 wt %) as silicone oil compound (SOC), polyoxyalkylene-modified organopolysiloxane (G) (30.00 wt %), and Nipsil AQ (50.00 wt %) as porous powder carrier (silica) (H) were weighed and mixed on a gate mixer at room temperature, forming a powder antifoaming agent of the composition shown in Table 1. Note that wt % in parentheses corresponds to the final composition of the antifoaming agent.

Evaluation Method

Samples of Examples and Comparative Examples were evaluated for spraying efficiency, foam inhibition and foam breakage as typical antifoaming properties, and product stability by the following tests.

(1) Spraying Efficiency

It was visually observed whether or not an emulsion agglomerated (including particle deposition and nozzle clogging) in the dryer chamber during the spray drying step, with ratings according to the following criterion.

◯: no severe agglomeration observed
Δi: some severe agglomeration observed
x: severe agglomeration observed or no powder formation (2) Antifoaming Property (Foam Inhibition)

To an aqueous solution obtained by diluting a commercially available detergent (trade name: Mama Lemon, Lion Corporation), each sample was added in an amount of 200 ppm as active ingredient. A standard jar No. 12 was charged with 70 g of the solution, which was stirred on a shaker at 250 rpm for 1 minute. The height (mm) of the liquid, inclusive of foam, immediately after the stop of shaking was measured and reported as "foam inhibition." The initial liquid height was 40 mm. When the liquid to which no antifoaming agent was added was stirred on the shaker at 250 rpm for 1 minute, the height of the liquid, inclusive of foam, immediately after the stop of shaking was 90 mm.

(3) Antifoaming Property (Foam Breakage)

To an aqueous solution obtained by diluting a commercially available detergent (trade name: Mama Lemon, Lion Corporation), each sample was added in an amount of 200 ppm as active ingredient. A standard jar No. 12 was charged with 70 g of the solution, which was stirred on a shaker at 250 rpm for 1 minute. The height (mm) of the liquid, inclusive of foam, after 1 minute from the stop of shaking was measured and reported as "foam breakage." The initial liquid height was 40 mm. When the liquid to which no antifoaming agent was added was stirred on the shaker at 250 rpm for 1 minute, the height of the liquid, inclusive of foam, after 1 minute from the stop of shaking was 90 mm.

(4) Product Stability

Each sample was exposed to air at room temperature for 7 days and stored at 40° C. for 6 months, after which its state was visually observed and rated according to the following criterion.

○: no separation, putrefaction or degradation observed
x: separation, putrefaction or degradation observed The results are shown in Table 1.

age. The powder of Comparative Example 5 based on a porous powder carrier had poor antifoaming properties because the antifoaming component was slowly released to the foaming liquid.

The invention claimed is:

1. A powder antifoaming agent comprising:
   (A) a hydrophobic organopolysiloxane having a viscosity of 10 to 100,000 mm$^2$/s at 25° C.,
   (B) finely divided silica,
   (C) a surfactant, and
   (D) a water-soluble encapsulant comprising maltodextrin, lactose or a mixture thereof,

TABLE 1

| | | | Example | | | | | Comparative Example | | | | |
|---|---|---|---|---|---|---|---|---|---|---|---|---|
| | | | 1 | 2 | 3 | 4 | 5 | 1 | 2 | 3 | 4 | 5 |
| Type of Antifoaming agent | | | Spray dried powder | | | | | | | Emulsion | | Powder |
| Components (wt %) | (SOC) | (SOC-a) | 6.4 | 6.4 | 2 | 6.4 | 6.4 | 6.4 | 16.5 | 32 | 10 | 5 |
| | | (SOC-b) | | | 4 | | | | | | 20 | 15 |
| | (C) | (c-1) | 0.8 | 0.8 | 0.8 | 0.8 | 0.8 | 0.8 | 2.1 | 4 | 2 | |
| | | (c-2) | | | 0.4 | | | | | | | 1 |
| | | (c-3) | 0.2 | 0.2 | | 0.2 | 0.2 | 0.2 | 0.5 | 1 | | |
| | | (c-4) | 0.4 | 0.4 | 0.2 | 0.4 | 0.4 | 0.4 | 1.05 | 2 | 1 | |
| | | (c-5) | | | 0.1 | | | | | | 0.5 | |
| | (D) | (d-1) | 12 | 12 | 12 | | | | | | | |
| | | (d-2) | | | | 12 | 12 | | | | | |
| | | (d-3) | | | | | | 12.5 | | | | |
| | (E) | Water | 80.15 | 80.15 | 81.10 | 80.15 | 80.15 | 79.65 | 79.70 | 60.95 | 65.50 | |
| | (F) | | 0.05 | 0.05 | | 0.05 | 0.05 | 0.05 | 0.15 | 0.05 | | |
| | (G) | | | | | | | | | | | 30 |
| | (H) | | | | | | | | | | | 50 |
| Spray conditions | Measured inlet temperature (° C.) | | 169 | 151 | 148 | 149 | 170 | 160 | 150 | — | — | — |
| | Measured outlet temperature (° C.) | | 63 | 60 | 59 | 58 | 88 | 76 | 92 | — | — | — |
| | Spraying efficiency | | ○ | ○ | ○ | ○ | Δ | x | x | — | — | — |
| Antifoaming properties | Foam inhibition (mm) | | 54 | 54 | 51 | 55 | 59 | — | — | 54 | 48 | 74 |
| | Foam breakage (mm) | | 47 | 49 | 44 | 49 | 56 | — | — | 46 | 42 | 55 |
| Product stability | 40° C. × 6 months | | ○ | ○ | ○ | ○ | ○ | — | — | x (Putrefied) | x (Putrefied) | ○ |

As is evident from the above results, the antifoaming agents of Examples 1 to 4 showed good spraying efficiency and product stability and their antifoaming properties were equivalent to the emulsion antifoaming agents of Comparative Examples 3 and 4. The antifoaming agent of Example 5 had good product stability, but some agglomeration in the dryer chamber during the spray drying step was observed in the test of spraying efficiency. The antifoaming properties of Example 5 were better than Comparative Example 5, but slightly inferior to Comparative Examples 3 and 4. Supposedly, in Example 5 where the dryer outlet temperature (88° C.) was not at least 30° C. lower than the glass transition temperature (101° C.) of lactose monohydrate as component (D), the emulsion agglomerated in the dryer chamber.

In Comparative Example 1 where the dryer outlet temperature (76° C.) was higher than the glass transition temperature (62° C.) of sucrose as component (D), sprayed particles melted in the dryer chamber, failing to obtain a powder. In Comparative Example 2 which did not contain the water-soluble encapsulant as component (D), greasy agglomerates formed rather than powder particles. The emulsion antifoaming agents of Comparative Examples 3 and 4 had excellent antifoaming properties, but putrefied during long-term storwherein the powder antifoaming agent is prepared by mixing components (A) and (B) to form a silicone oil compound, dispersing the silicone oil compound and component (D) in water in the presence of component (C), and spray drying the water dispersion, the silicone oil compound being encapsulated in a shell of component (D).

2. The powder antifoaming agent of claim 1, wherein component (D) is maltodextrin.

3. A method for preparing a powder antifoaming agent, comprising the steps of mixing (A) a hydrophobic organopolysiloxane having a viscosity of 10 to 100,000 mm$^2$/s at 25° C. with (B) finely divided silica to form a silicone oil compound, dispersing the silicone oil compound and (D) a water-soluble encapsulant comprising maltodextrin, lactose or a mixture thereof, in water with the aid of (C) a surfactant to form a water dispersion, and spray drying the water dispersion by a spray dryer method while a dryer outlet temperature in the spray drying step is set lower than the glass transition temperature of component (D).

4. The method of claim 3, wherein a dryer inlet temperature in the spray drying step of the spray dryer method is 100 to 250° C.

5. The method of claim 3 or 4, wherein the dryer outlet temperature in the spray drying step in the spray dryer method is at least 30° C. lower than the glass transition temperature of component (D).

6. The method of claim 3, wherein component (D) is maltodextrin.

7. The powder antifoaming agent of claim 1, wherein component (B) is used in an amount of 1 to 20 parts by weight per 100 parts by weight of component (A).

8. The method of claim 3, wherein component (B) is used in an amount of 1 to 20 parts by weight per 100 parts by weight of component (A).

* * * * *